United States Patent
Martin et al.

(10) Patent No.: US 12,374,876 B2
(45) Date of Patent: Jul. 29, 2025

(54) VIDEO INSPECTION SYSTEM APPARATUS AND METHODS WITH RELAY MODULES AND CONNECTION PORTS

(71) Applicant: SeeScan, Inc., San Diego, CA (US)

(72) Inventors: Michael J. Martin, San Diego, CA (US); Mark S. Olsson, La Jolla, CA (US); Alexander L. Warren, Escondido, CA (US)

(73) Assignee: SeeScan, Inc., San Diego, CA (US)

( * ) Notice: Subject to any disclaimer, the term of this patent is extended or adjusted under 35 U.S.C. 154(b) by 726 days.

(21) Appl. No.: 17/528,956

(22) Filed: Nov. 17, 2021

(65) Prior Publication Data

US 2022/0416528 A1 Dec. 29, 2022

Related U.S. Application Data

(60) Provisional application No. 63/115,548, filed on Nov. 18, 2020, provisional application No. 63/115,009, filed on Nov. 17, 2020.

(51) Int. Cl.
*H02G 11/02* (2006.01)
*G01N 21/954* (2006.01)
*H04N 23/50* (2023.01)
*H04N 23/661* (2023.01)

(52) U.S. Cl.
CPC ........... *H02G 11/02* (2013.01); *G01N 21/954* (2013.01); *H04N 23/661* (2023.01); *G01N 2021/9542* (2013.01); *H04N 23/555* (2023.01)

(58) Field of Classification Search
CPC ...... H02G 11/02; H02G 1/083; G01N 21/954; G01N 2021/9542; H04N 23/661; H04N 23/555
USPC ....................................... 356/241.1
See application file for complete search history.

(56) References Cited

U.S. PATENT DOCUMENTS

| | | | | |
|---|---|---|---|---|
| 4,929,199 | A * | 5/1990 | McKinnon | H01R 11/24 439/759 |
| 10,855,950 | B1 * | 12/2020 | Chapman | H04N 7/10 |
| 11,558,537 | B1 * | 1/2023 | Olsson | H04N 7/183 |
| 2002/0113870 | A1 * | 8/2002 | Mueckl | H04N 7/185 348/84 |
| 2012/0069172 | A1 * | 3/2012 | Hudritsch | G01N 21/954 348/84 |
| 2018/0169719 | A1 * | 6/2018 | Turner | B65H 75/403 |

* cited by examiner

*Primary Examiner* — Seung C Sohn
(74) *Attorney, Agent, or Firm* — Steven C. Tietsworth, Esq.; Michael J. Pennington, Esq.

(57) ABSTRACT

A novel connection port is described for connecting a signal transmitter to an apparatus configured to wirelessly communicate video and images from a pipe inspection system. Such a connection port may establish an electrically conductive pathway to a push-cable and camera head further disposed in cable storage drum that the wireless communication apparatus may couple thereto. A signal transmitter, having an established electrically conductive pathway to the push-cable and camera head, may transmit electromagnetic signals that may be emitted by the push-cable and camera head and further be located at the ground surface via a utility locator device.

34 Claims, 10 Drawing Sheets

VIDEO INSPECTION SYSTEM APPARATUS AND METHODS WITH RELAY MODULES AND CONNECTION PORTS

CROSS-REFERENCE TO RELATED APPLICATIONS

This application claims priority under 35 U.S.C. § 119(e) to U.S. Provisional Patent Application Ser. No. 63/115,009 entitled SIGNAL TRANSMITTER CONNECTION PORT FOR WIRELESS INSPECTION AND LOCATING SYSTEM, filed Nov. 17, 2020, and Ser. No. 63/115,548 entitled VIDEO INSPECTION SYSTEM APPARATUS AND METHODS WITH RELAY MODULES AND CONNECTION PORTS, filed Nov. 18, 2020, the contents of which are incorporated by reference herein in their entirety for all purposes.

FIELD

This disclosure relates generally to video inspection apparatus and systems. More specifically, but not exclusively, the disclosure relates to inspection system apparatus including connection ports for operatively coupling a transmitter output to a push-cable and/or video camera head for locating the push-cable and/or camera head with a utility locator.

BACKGROUND

There are many situations where it is desirable to internally inspect pipes or other cavities or voids that may be underground, in a building, underwater, or other difficult to access locations. For example, various utility pipes (e.g., sewer, water, or the like) frequently must be internally inspected to diagnose problems and to determine if there are breaks causing leakage or obstructions impairing flow of fluids or gas therein. Likewise, utility pipes may require excavation for repair, improvement, or other servicing. Precise locating of the utility pipes may be critical in facilitating safe and efficient excavation.

Traditional inspection systems known in the art for inspecting utility pipes and other cavities include a camera head disposed on one end (i.e., a distal end) of a push-cable that is dispensed from a cable storage drum to move the camera head into the pipe or cavity. Images or video from the camera head are sent through the push-cable back to a user, allowing the user to display the interior of the pipe on a camera control unit (CCU) or other display device. The images or video may then be used by an operator to visually inspect the interior of the pipes and identify defects caused by, for example, the ingress of roots, pipe cracks or breaks, corrosion, leakage, and/or other defects or blockages inside the pipe or cavity.

In order to find the relative position of identified defects when the pipes are buried under the ground, it is desirable to identify a corresponding position on the ground or other surface above the pipe. This is commonly done using a device known in the field as a utility locator or just a locator for brevity. A common type of locator finds this position by receiving and processing AC magnetic field signals emitted from the pipe (or other conductors disposed in the pipe or in a cavity). These magnetic field signals may be inherent in the pipe, such as from AC power flowing therein or from other inductively coupled electromagnetic signals, or may result from current signals generated by a transmitter that are directly or inductively coupled to the pipe. In applications where the pipes or cavities are not conductive (e.g., PVC pipes or other non-conductive pipes), or in cavities, the push-cable itself may be energized with a current signal so that the push-cable generates an AC magnetic field signal that is then detected and processed by the locator. Alternately, or in addition, camera heads may also be powered to generate a magnetic field, such as through use of a sonde device in, on, or in proximity to the camera head. Such a sonde device may generate an AC dipole magnetic field signal that is also detectable by a locator.

A camera control unit or CCU is a device known in the field for providing power, controlling camera head operation, and/or receiving, displaying, and storing image or video signals from the camera head. Because a typical CCU generally remains stationary during an inspection, the CCU provides a logical device through which to couple a transmitter's output signal. As such, existing systems known in the art to couple a transmitter to a push-cable do so at the CCU. This connection couples the transmitter current output signal to the CCU and then to a push-cable operatively connected to the CCU so that the push-cable will radiate an AC magnetic field signal for detection by an associated locator.

Recent video inspection systems such as those provided by Applicant are designed to eliminate the need for a CCU by wirelessly sending, such as via WiFi, Bluetooth, and the like, images or video from the camera head directly to a display device such as a smart phone, laptop, tablet, and the like. This wireless functionality may be implemented on or in a cable storage drum or other inspection system device, however, existing systems lack the ability to readily connect a transmitter to a push-cable or other inspection system device when no CCU is used.

Accordingly, there is a need in the art to address the above-described as well as other problems in the field.

SUMMARY

The present disclosure relates to connection ports used in wireless inspection and locating systems for connecting a transmitter to generate and transmit electromagnetic signals further to a push-cable and camera head for locating at the ground surface.

The present invention may include: a connection port disposed on a wireless pipe inspection video transmission apparatus that, attached to a rotating portion of a cable storage drum of a pipe inspection system, establishes, via a wire, an electrically conductive pathway with a transmitter to transmit electromagnetic signals to a push-cable and a camera head further coupled to the cable storage drum such that the push-cable and camera head may be locatable at the ground surface via a utility locator device to determine the location of the push-cable and camera head therein.

The present invention may include a combined pipe inspection and locating system including wireless pipe inspection video transmission. The system may include a cable storage drum for storing and dispensing of a push-cable such that it may be moved through a pipe or other conduit and may further include a camera head coupled to the distal end of the push-cable for inspecting the interior of the pipe or other conduit. The system may include a wireless pipe inspection video transmission apparatus for wirelessly communicating data relating to the in-pipe video or imagery collected at the camera head to one or more display devices. The in-pipe video and imagery may be communicated with one or more display devices for purposes of displaying the video and imagery and controlling the camera head and inspection system. The system may further include a transmitter for generating an electromagnetic signal at one or more known frequencies. The system may include a utility locator device having one or more antennas and associated receiver circuitry to receive electromagnetic signals at the ground level, process signals via one or more processors and associated non-transitory memories to determine the emission location of signals at the frequency or frequencies transmitted by the transmitter, and a graphical user interface to communicate the locations. The system further includes a connection port disposed on the wireless pipe inspection video transmission apparatus that, attached to a rotating portion of the cable storage drum, establishes, via a wire, an electrically conductive pathway with the transmitter to transmit electromagnetic signals to the push-cable and camera head at one or more known frequencies.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Overview

Figure 1A:
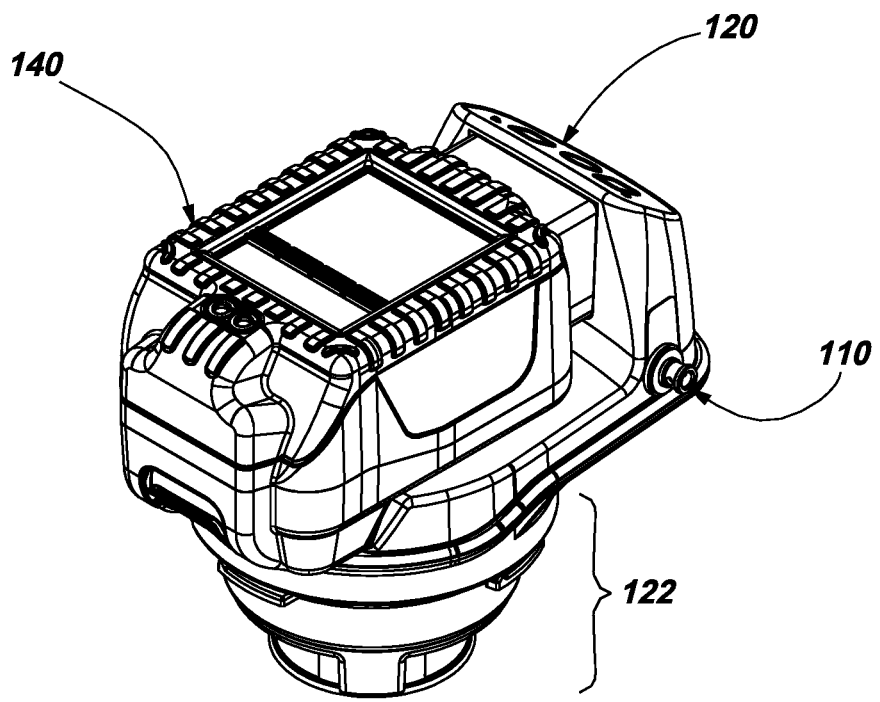
FIG. 1A is an illustration of a wireless pipe inspection video transmission apparatus that includes a connection port.

The present disclosure relates to connection ports used in wireless inspection and locating systems for connecting a transmitter to generate and transmit electromagnetic signals further to a push-cable and camera head for locating at the ground surface.

Details of example devices, systems, and methods that may be combined with the connection ports and associated wireless inspection and locating system and device embodiments herein, as well as additional components, methods, and configurations that may be used in conjunction with the embodiments described herein, are disclosed in co-assigned patents and patent applications including: U.S. Pat. No. 5,939,679, issued Aug. 17, 1999, entitled VIDEO PUSH-CABLE; U.S. Pat. No. 6,545,704, issued Apr. 8, 2003, entitled VIDEO PIPE INSPECTION DISTANCE MEASURING SYSTEM; U.S. Pat. No. 6,697,102, issued Feb. 24, 2004, entitled BORE HOLE CAMERA WITH IMPROVED FORWARD AND SIDE VIEW ILLUMINATION; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR BURIED PIPES AND CABLES; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,864,980, issued Jan. 4, 2011, entitled SONDES FOR LOCATING UNDERGROUND PIPES AND CONDUITS; U.S. Pat. No. 8,013,610, issued Sep. 6, 2011, entitled HIGH Q SELF-TUNING LOCATING TRANSMITTER; U.S. Pat. No. 8,289,385, issued Oct. 16, 2012, entitled PUSH-CABLE FOR PIPE INSPECTION SYSTEM; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. patent application Ser. No. 13/769,202, filed Feb. 15, 2013, entitled SMART PAINT STICK DEVICES AND METHODS; U.S. Pat. No. 8,395,661, issued Mar. 12, 2013, entitled PIPE INSPECTION SYSTEM WITH SELECTIVE IMAGING CAPTURE; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,587,648, issued Nov. 19, 2013, entitled SELF-LEVELING CAMERA HEAD; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS;

U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. Pat. No. 9,207,350, issued Dec. 8, 2015, entitled BURIED OBJECT LOCATOR APPARATUS WITH SAFETY LIGHTING ARRAY; U.S. Pat. No. 9,222,809, issued Dec. 29, 2015, entitled PORTABLE PIPE INSPECTION SYSTEMS AND APPARATUS; U.S. Pat. No. 9,341,740, issued May 17, 2016, entitled OPTICAL GROUND TRACKING APPARATUS, SYSTEMS, AND METHODS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,521,303, issued Dec. 13, 2016, entitled CABLE STORAGE DRUM WITH MOVABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,199, issued Apr. 25, 2017, entitled INDUCTIVE CLAMP DEVICES, SYSTEMS, AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); U.S. patent application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; U.S. patent application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. Pat. No. 9,746,572, issued Aug. 29, 2017, entitled ELECTRONIC MARKER DEVICES AND SYSTEMS; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS & METHODS; U.S. Pat. No. 9,835,564, issued Dec. 5, 2017, entitled MULTI-CAMERA PIPE INSPECTION APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,001,425, issued Jun. 19, 2018, entitled PORTABLE CAMERA CONTROLLER PLATFORM FOR USE WITH PIPE INSPECTION SYSTEM; U.S. Pat. No. 10,009,582, issued Jun. 26, 2018, entitled PIPE INSPECTION SYSTEM WITH REPLACEABLE CABLE STORAGE DRUM; U.S. Pat. No. 10,042,072, issued Aug. 7, 2018, entitled OMNI-INDUCER TRANSMITTING DEVICES AND METHODS; U.S. patent application Ser. No. 16/049,699, filed Jul. 30, 2018, entitled OMNI-INDUCER TRANSMITTING DEVICES AND METHODS; U.S. Pat. No. 10,073,186, issued Sep. 11, 2018, entitled KEYED CURRENT SIGNAL UTILITY LOCATING SYSTEMS AND METHODS; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application, filed Dec. 31, 2018, entitled ADJUSTABLE VARIABLE RESOLUTION INSPECTION SYSTEMS AND METHODS; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. patent application Ser. No. 29/692,937, filed May 29, 2019, entitled BURIED OBJECT LOCATOR; U.S. patent application Ser. No. 16/443,789, filed Jun. 17, 2019, entitled MULTI-DIELECTRIC COAXIAL PUSH-CABLES AND ASSOCIATED APPA- RATUS; U.S. patent application Ser. No. 16/449,187, filed Jun. 21, 2019, entitled ELECTROMAGNETIC MARKER DEVICES FOR BURIED OR HIDDEN USE; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,401,526, issued Sep. 3, 2019, entitled BURIED UTILITY MARKER DEVICES, SYSTEMS, AND METHODS; U.S. Pat. No. 10,371,305, issued Aug. 6, 2019, entitled DOCKABLE TRIPODAL CAMERA CONTROL UNIT; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/680,383, filed Nov. 11, 2019, entitled HEAT EXTRACTION ARCHITECTURE FOR COMPACT VIDEO CAMERA HEADS; U.S. patent application Ser. No. 16/676,292, filed Nov. 6, 2019, entitled ROBUST IMPEDANCE CONTROLLED SLIP RINGS; U.S. patent application Ser. No. 16/687,057, filed Nov. 18, 2019, entitled PIPE INSPECTION AND/OR MAPPING CAMERA HEADS, SYSTEMS, AND METHODS; U.S. patent application Ser. No. 16/701,085, filed Dec. 2, 2019, entitled MAP GENERATION BASED ON UTILITY LINE POSITION AND ORIENTATION ESTIMATES; U.S. Patent Application 62/943,164, filed Dec. 3, 2019, entitled INTEGRAL DUAL CLEANER CAMERA DRUM SYSTEMS AND METHODS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,569,952, issued Feb. 25, 2020, entitled MARKING PAINT APPLICATOR FOR USE WITH PORTABLE UTILITY LOCATOR; U.S. Provisional Patent Application 62/984,768, filed Mar. 3, 2020, entitled DOCKABLE CAMERA REEL AND CCU SYSTEM; U.S. patent application Ser. No. 16/810,788, filed Mar. 5, 2019, entitled MAGNETICALLY RETAINED DEVICE HANDLES; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. Provisional Patent Application 63/012,480, filed Apr. 20, 2020, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING: U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. patent application Ser. No. 16/921,775, filed Jul. 6, 2020, entitled AUTO-TUNING CIRCUIT APPARATUS AND METHODS; U.S. Pat. No. 8,587,648, issued Jul. 14, 2020, entitled SELF-LEVELING CAMERA HEADS; U.S. Provisional Patent Application 63/055,278, filed Jul. 22, 2020, entitled VEHICLE-BASED UTILITY LOCATING USING PRINCIPAL COMPONENTS; U.S. Provisional Patent Application 63/063,151, filed Aug. 7, 2020, INSPECTION SYSTEM PUSH-CABLE GUIDE APPARATUS; U.S. Pat. No. 10,764,541, issued Sep. 1, 2020, entitled COAXIAL VIDEO PUSH-CABLES FOR USE IN INSPECTION SYSTEMS; U.S. patent application Ser. No. 17/014,646, filed Sep. 8, 2020, entitled INTEGRATED FLEX-SHAFT CAMERA SYSTEM WITH HAND CONTROL; U.S. patent application Ser. No. 16/588,834, issued Sep. 9, 2019, entitled VIDEO INSPECTION SYSTEM WITH WIRELESS ENABLED CABLE STORAGE DRUM; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; and U.S. Pat. No. 10,809,408, issued Oct. 20, 2020, entitled DUAL SENSED LOCATING SYSTEMS AND METHODS. The content of each of the above-described patents and applications is incorporated by reference herein in its entirety. The above applications may be collectively denoted herein as the "co-assigned applications" or "incorporated applications."

The following disclosure of various embodiments of the invention is provided to illustrate different aspects, details, and functions of the present invention. It is to be understood that embodiments described herein are not intended to be in any way limiting. It will be apparent to one of ordinary skill in the art that various aspects may be implemented in other embodiments within the spirit and scope of the present disclosure.

For example, in accordance with one aspect of the invention, the present invention may include a connection port disposed on a wireless pipe inspection video transmission apparatus that, attached to a rotating portion of a cable storage drum of a pipe inspection system, establishes, via a wire, an electrically conductive pathway with a transmitter to transmit electromagnetic signals to a push-cable and camera head further coupled to the cable storage drum such that the push-cable and camera head may be locatable at the ground surface via a utility locator device to determine the location of the push-cable and camera head therein.

In another aspect, the present invention may include a combined pipe inspection and locating system including wireless pipe inspection video transmission. The system may include a cable storage drum for storing and dispensing of a push-cable such that it may be moved through a pipe or other conduit and may further include a camera head coupled to the distal end of the push-cable for inspecting the interior of the pipe or other conduit. The system may include a wireless pipe inspection video transmission apparatus for wirelessly communicating data relating to the in-pipe video or imagery collected at the camera bead to one or more display devices. The in-pipe video and imagery may be communicated with one or more display devices for purposes of displaying the video and imagery and controlling the camera head and inspection system. In some embodiments, the display device may be or include a smart phone, tablet, laptop computer, or like computing device. Likewise, in some embodiments, the display device may be or include a wirelessly connected CCU. In yet further embodiments, the display device may be or include a graphical user interface of a utility locator device. The system may further include a transmitter, which may be a multi-frequency transmitter, for generating an electromagnetic signal at one or more known frequencies. The system may include a utility locator device having one or more antennas and associated receiver circuitry to receive electromagnetic signals at the ground level, process signals via one or more processors and associated non-transitory memories to determine the emission location of signals at the frequency or frequencies transmitted by the transmitter, and a graphical user interface to communicate the locations. The system further includes a connection port disposed on the wireless pipe inspection video transmission apparatus that, attached to a rotating portion of the cable storage drum, establishes, via a wire, an electrically conductive pathway with the transmitter to transmit electromagnetic signals to the push-cable and camera head at one or more known frequencies.

In various embodiments, the wireless pipe inspection transmission apparatus may be a separate device that couples to a pipe inspection cable storage drum. In other embodiments, the wireless pipe inspection transmission apparatus may be built into a pipe inspection cable storage drum. In such embodiments, the connection port may be located on the cable storage drum at a location other than the wireless pipe inspection transmission apparatus.

In another aspect, the connection ports or associated wireless pipe inspection and locating systems may include a slip ring or other electromechanical connection for the transmission of electromagnetic signals from a stationary connection port, stationary portion of the connection port, or stationary wireless pipe inspection transmission apparatus to a rotating portion of the cable storage drum.

Example Embodiments

Figure 1B:
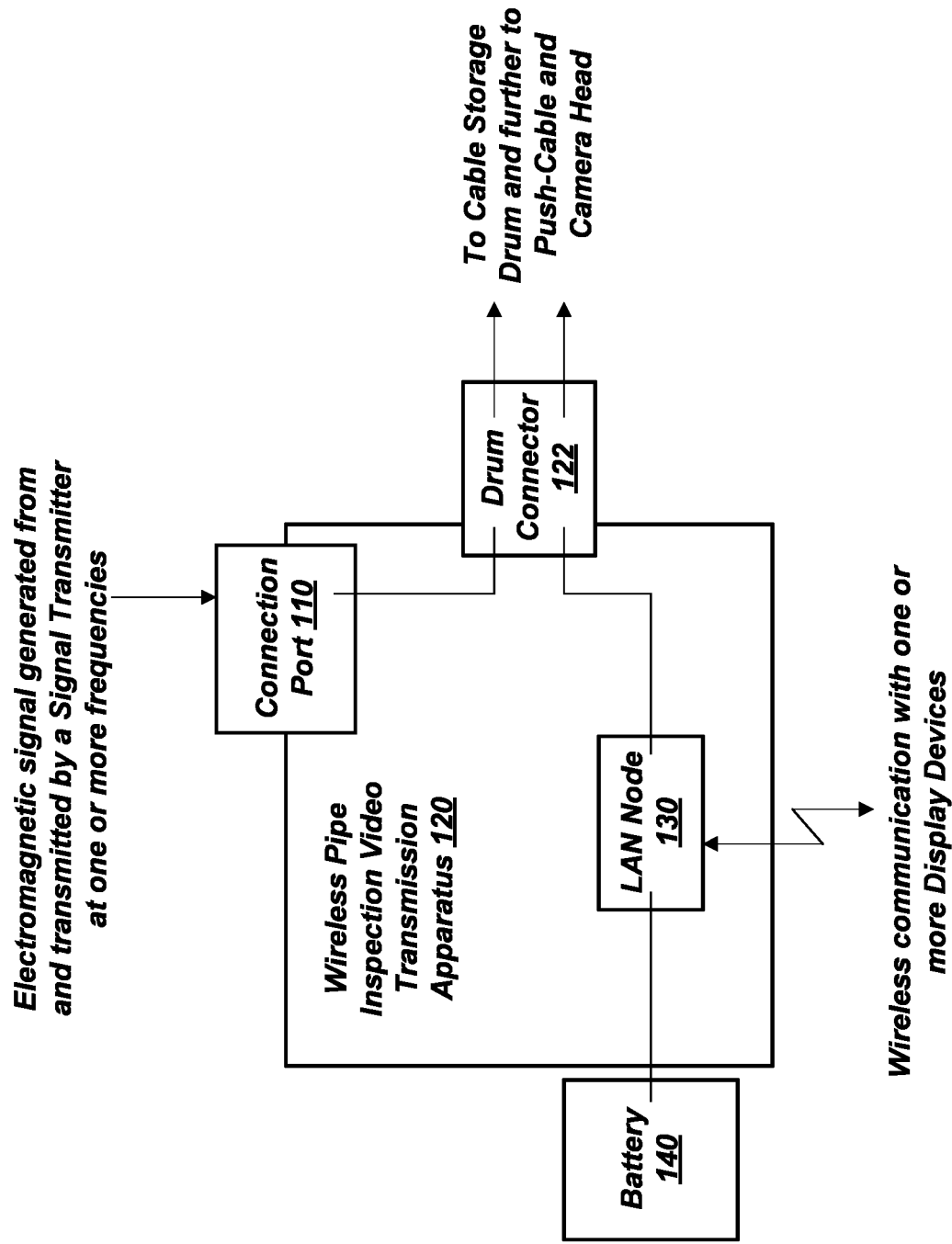
FIG. 1B is a diagram of the wireless pipe inspection video transmission apparatus and connection port of FIG. 1A.

Turning to FIGS. 1A and 1B, a wireless pipe inspection video transmission apparatus 120 (also denoted herein as a pipe inspection system relay module, or simply "relay module" for brevity) with a connection port 110 in accordance with aspects of the present disclosure is illustrated. Relay modules as described herein are also referred to in the drawing figures as "wireless pipe inspection video transmission apparatus, such as shown in FIGS. 1B, 1D, 2B, 3B, and 4B.

Relay module 120 (as well as the other relay module embodiments disclosed herein) may include electronics, hardware, and software to operatively couple, electrically and mechanically, to a video pipe inspection system cable storage drum or other inspection system device. In operation, the relay module 120 receives image and/or video signals from a camera head and sends these signals to a wirelessly connected device such as via a WiFi or other local area network (LAN), cellular network, or other wireless communications channel. In some embodiments (not shown) wireless connectivity may also be implemented, for example using an Ethernet connector, serial connector, or other wired connection apparatus. Relay module 120 may also include electronics for performing signal processing of the image or video signals, providing or relaying control signals and/or power to the camera head, and other associated functions.

As noted above, relay module 120 may include one or more radio transceivers, such as a local area network (LAN) node 130 (FIG. 1B), which may be or include Bluetooth, Wi-Fi or other wireless local area network (WLAN), cellular data transceivers, or like radio transceivers to communicate with one or more display devices (e.g., tablet 272 of FIG. 2A) for the purposes of displaying video and imagery as well as controlling the video inspection system. A one-time use or rechargeable battery 140 may be electrically connected to the relay module 120 for providing electrical power to the LAN node 130, to other electronics in the relay module 120, as well as to a camera head disposed on the distal end of a push-cable as shown in, for example, FIG. 2A as camera head 265.

Figure 1C:
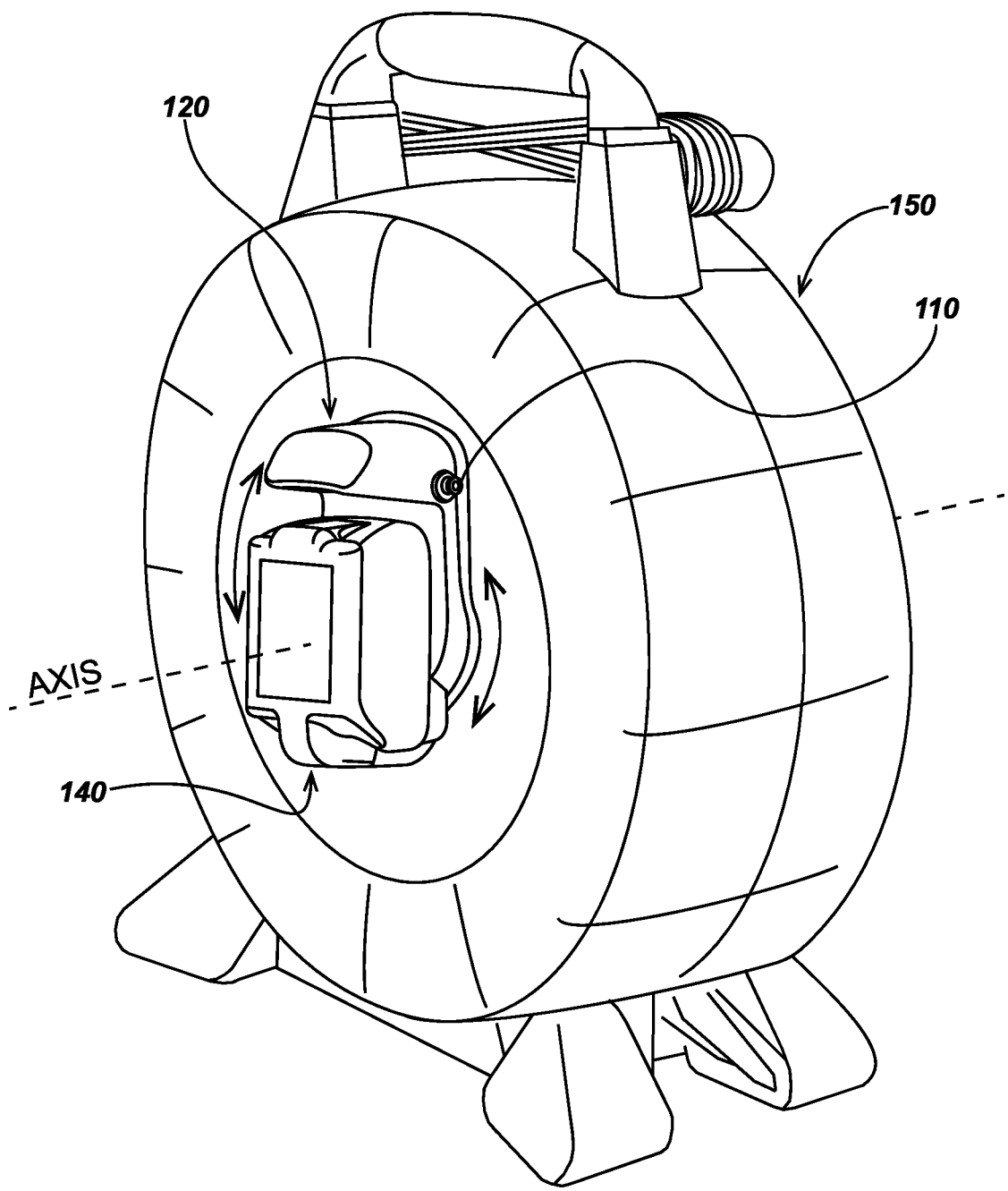
FIG. 1C is an illustration of the wireless pipe inspection video transmission apparatus and connection port further installed in a cable storage drum.
Figure 1D:
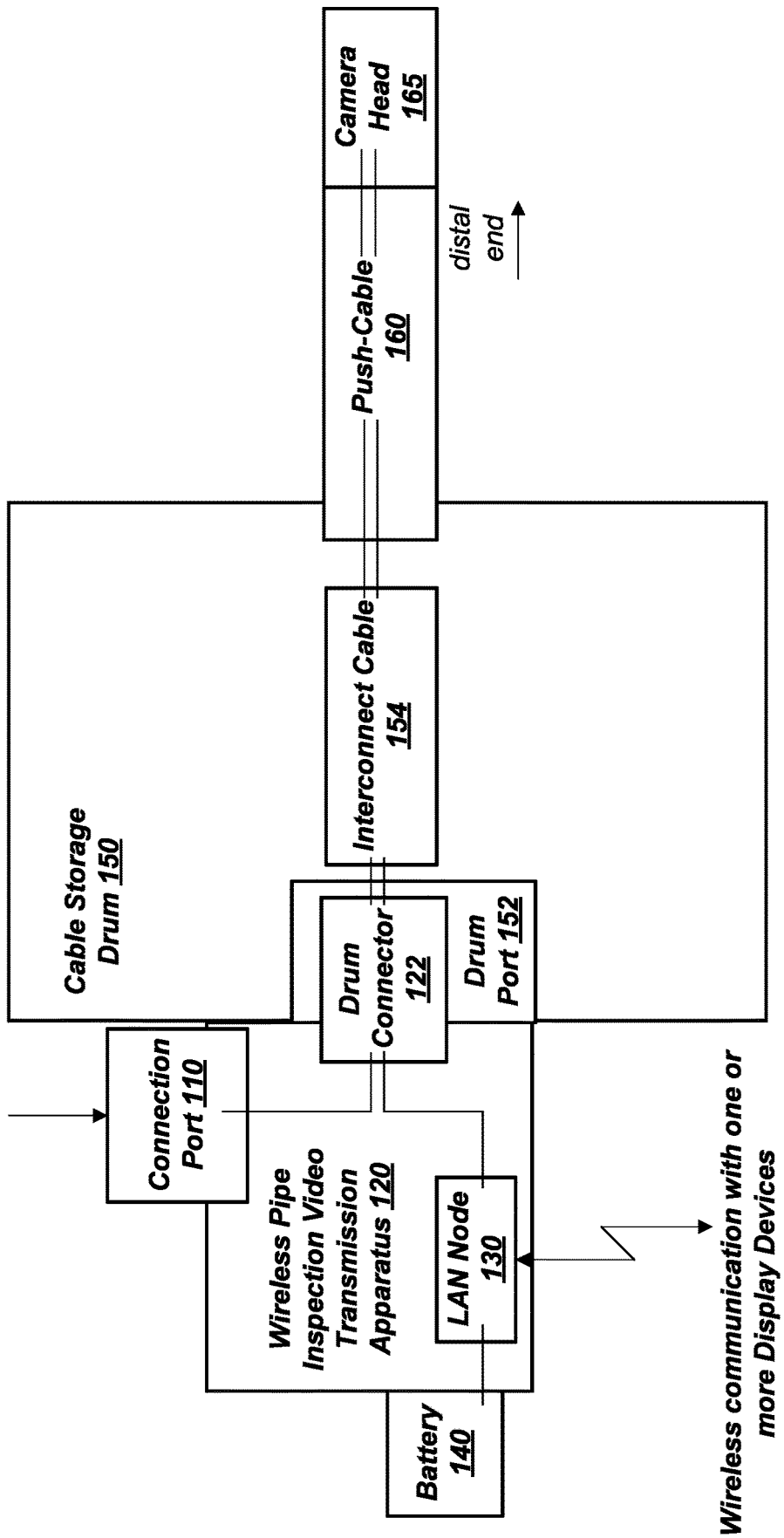
FIG. 1D is a diagram of the wireless pipe inspection video transmission apparatus with connection port and the cable storage drum of FIG. 1C.
Figure 2A:
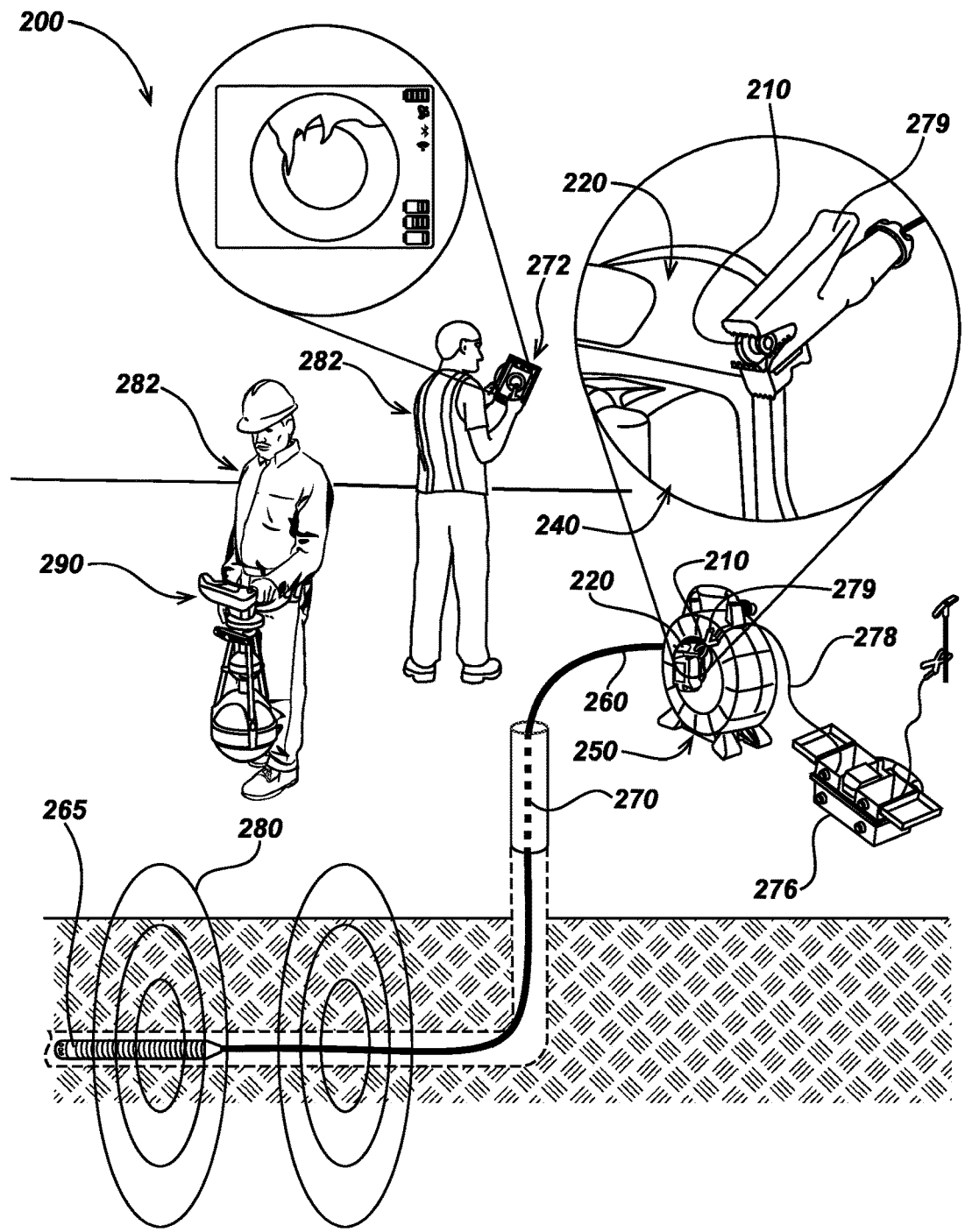
FIG. 2A is an illustration of a wireless pipe inspection and locating system.

In operation, the camera head may be coupled to the distal end of the push-cable, with the push-cable dispensed from a cable storage drum and moved into and through a pipe or other area of inspection (e.g., camera head 165 disposed on the distal end of push-cable 160 dispensed from the cable storage drum 150 illustrated in FIG. 1D or camera head 265 on push-cable 260 from drum 250 as shown in FIG. 2A). The proximal end of the push-cable may be operatively coupled to connectors and/or electronics on or in a cable storage drum, such as drum 150 of FIG. 1C or drum 250 of FIG. 2A.

The battery 140 may be a rechargeable smart battery such as those disclosed in co-assigned U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/520,248, filed Jul. 23, 2019, entitled MODULAR BATTERY PACK APPARATUS, SYSTEMS, AND METHODS; and U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER, the contents of which are hereby incorporated by reference herein in their entirety. Relay module 120 may include a drum connector 122 that, in use, may mechanically and electrically couple relay module 120 to a cable storage drum (e.g., the cable storage drum 150 of FIGS. 1C and 1D).

Additional details of an embodiment of a relay module and associated video inspection system elements are shown in FIGS. 1C and 1D. The relay module 120 may include a transmitter output signal connection port 110 (also denoted herein as a connection port or just port for brevity). Connection port 110 may comprise of various types of electrical connectors at a first end or first connection point to receive, via direct electrical contact, an output current signal from a transmitter, e.g., via conductor 278 as shown in FIG. 2A from transmitter 276 (where the output current signal may be at one or more AC current frequencies and/or may be modulated with analog or digital modulation). For example, an exemplary embodiment of a connection port may comprise a conductive stud or other protrusion extending outward from the relay module, such as, for example, the stud portion of connection port 210 as shown in exploded view in FIG. 2A on relay module 220.

A clip at one end of a wire, such as clip 279 at the end of wire 278, can be readily attached or detached from the stud to provide the electrical contact connection. Other embodiments may comprise sockets and associated plugs, rotational studs and associated connectors, as well as other electrical contact connection mechanisms as are known or developed in the art. In an exemplary embodiment the first end of the connection port is configured to allow a user to readily attach or detach a wire from the transmitter and also accommodate rotation of the cable storage drum and/or relay module.

Connection port 10 may be configured at a second end or second connection point to electrically couple the current signal out of the port to a cable storage drum 150 electrical conductive element, for example via a drum connector 122 (FIGS. 1A, 1B, and 1D). In an exemplary embodiment, drum connector 122 may mate with a drum port 152 along the central axis of the cable storage drum 150. The second end or second connection point may be electrically coupled to the first end using, for example, a conductive wire internal to the relay module, a conductive insert molded or installed into the relay module, or via other electrical contact connection mechanisms. In some embodiments the connection port may be an integral conductor, such as a formed conductive metal piece installed on or into the relay module.

Various aspects and details of embodiments of cable storage drums and associated elements or apparatus, such as the cable storage drum 150 shown in FIGS. 1C and 1D and 250 as shown in FIG. 2A, as well as other cable storage drum embodiments and apparatus shown or described herein, are described and illustrated in the exemplary embodiments of co-assigned U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 9,521,303, issued Dec. 13, 2016, entitled CABLE STORAGE DRUM WITH MOVABLE CCU DOCKING APPARATUS; U.S. Pat. No. 10,009,582, issued Jun. 26, 2018, entitled PIPE INSPECTION SYSTEM WITH REPLACEABLE CABLE STORAGE DRUM; and U.S. patent application Ser. No. 16/588,834, issued Sep. 9, 2019, entitled VIDEO INSPECTION SYSTEM WITH WIRELESS ENABLED CABLE STORAGE, the contents of which are incorporated by reference herein.

The connection between the drum connector 122 to drum port 152 may establish an electrically conductive path from the connection port 110 to the cable storage drum 150. Such an electrically conductive pathway may, as shown in FIG. 1D, continue through an interconnect cable 154 and on to a push-cable 160 and/or camera head 165. In some embodiments, the electrically conductive pathway may be or include a ground wire disposed on or in the push-cable 160. In other embodiments, the push-cable 160 may include a separate conductor for coupling the output current signal from the transmitter (e.g., transmitter 276 of FIGS. 2A and 2B). Flow of the transmitter output current signal in the push-cable may generate an AC magnetic field signal that may then be detected by an associated utility locator, such as locator 290 as shown in FIG. 2A.

Various aspects and details regarding push-cable embodiments as may be used in implementations of systems in accordance with this disclosure, such as the push-cable 160 and/or other push-cable herein, are described in co-assigned U.S. Pat. No. 7,276,910, issued Oct. 2, 2007, entitled U.S. Pat. No. 5,939,679, issued Aug. 17, 1999, entitled VIDEO PUSH-CABLE; U.S. Pat. No. 8,289,385, issued Oct. 16, 2012, entitled PUSH-CABLE FOR PIPE INSPECTION SYSTEM; U.S. Pat. No. 9,448,376, issued Sep. 20, 2016, entitled HIGH BANDWIDTH PUSH-CABLES FOR VIDEO PIPE INSPECTION SYSTEMS; U.S. patent application Ser. No. 16/443,789, filed Jun. 17, 2019, entitled MULTI-DIELECTRIC COAXIAL PUSH-CABLES AND ASSOCIATED APPARATUS; U.S. Pat. No. 10,764,541, issued Sep. 1, 2020, entitled COAXIAL VIDEO PUSH-CABLES FOR USE IN INSPECTION SYSTEMS of the incorporated patents and applications.

Likewise, various aspects and details regarding camera head embodiments that may be used in systems in accordance with the disclosures here, such as the camera head 165 and/or other camera heads herein, are described in co-assigned U.S. Pat. No. 6,831,679, issued Dec. 14, 2004, entitled VIDEO CAMERA HEAD WITH THERMAL FEEDBACK LIGHTING CONTROL; U.S. Pat. No. 8,587,648, issued Nov. 19, 2013, entitled SELF-LEVELING CAMERA HEAD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 10,288,997, issued May 14, 2019, entitled ROTATING CONTACT ASSEMBLIES FOR SELF-LEVELING CAMERA HEADS; U.S. patent application Ser. No. 16/680,383, filed Nov. 11, 2019, entitled HEAT EXTRACTION ARCHITECTURE FOR COMPACT VIDEO CAMERA HEADS; U.S. patent application Ser. No. 16/687,057, filed Nov. 18, 2019, entitled PIPE INSPECTION AND/OR MAPPING CAMERA HEADS, SYSTEMS, AND METHODS; U.S. Pat. No. 8,587,648, issued Jul. 14, 2020, entitled SELF-LEVELING CAMERA HEADS of the incorporated patents and applications.

Referring to FIG. 1C, it should be noted that in an exemplary embodiment the relay module 120 may secure to a portion of the cable storage drum 150 such that, when in use, it may rotate to dispense push-cable (e.g., the push-cable 160 of FIG. 1D). As such, the connection port 110 may be placed in a location on the relay module that is readily accessible to a user in order to facilitate ease in connecting and disconnecting a wire from an associated transmitter (e.g. wire 278 from transmitter 276 of FIGS. 2A and 2B). The connection port 110 may also be positioned on the relay module to prevent damage to the wire from the transmitter (e.g. wire 278 of FIGS. 2A and 2B) that may be caused by rotational movements of the cable storage drum 150 and relay module 120 coupled thereto. For instance, the connection port 110 may be located near the outer extremity of the relay module 120 to avoid snagging on other components and preventing twisting that could cause mechanical damage to the wire (e.g. the wire 278 of FIGS. 2A and 2B).

Likewise, a terminal connector used to removably couple the wire from a transmitter to the connection port 110 (e.g., the clip 279 on the wire 278 from transmitter 276 of FIGS. 2A and 2B) may be chosen or configured to prevent damage to the wire during cable storage drum rotations. In embodiments where the relay module 120 and connected connector port 110 rotate with the rotating portion of the cable storage drum 150, a terminal connector, such as the clip 279 of FIGS. 2A and 2B, may be selected such that it may secure onto and move with the connection port 110 to counteract twisting of the wire during rotations of the cable storage drum 150 and relay module 120 preventing mechanical damage thereto. In other embodiments (not illustrated), the terminal connector may be a specialized connector to couple to the connection port 110 and prevent wire damage during such rotations.

Various aspects and details regarding clips, such as the clip 279 and/or other clips or terminal connectors are described in co-assigned U.S. Pat. No. 7,288,929, issued Oct. 30, 2007, entitled INDUCTIVE CLAMP FOR APPLYING SIGNAL TO BURIED UTILITIES; U.S. Pat. No. 9,632,199, issued Apr. 25, 2017, entitled INDUCTIVE CLAMP DEVICES, SYSTEMS, AND METHODS; and U.S. Pat. No. 10,777,919, issued Sep. 15, 2020, entitled MULTIFUNCTION BURIED UTILITY LOCATING CLIPS of the incorporated patents and applications.

Figure 2B:
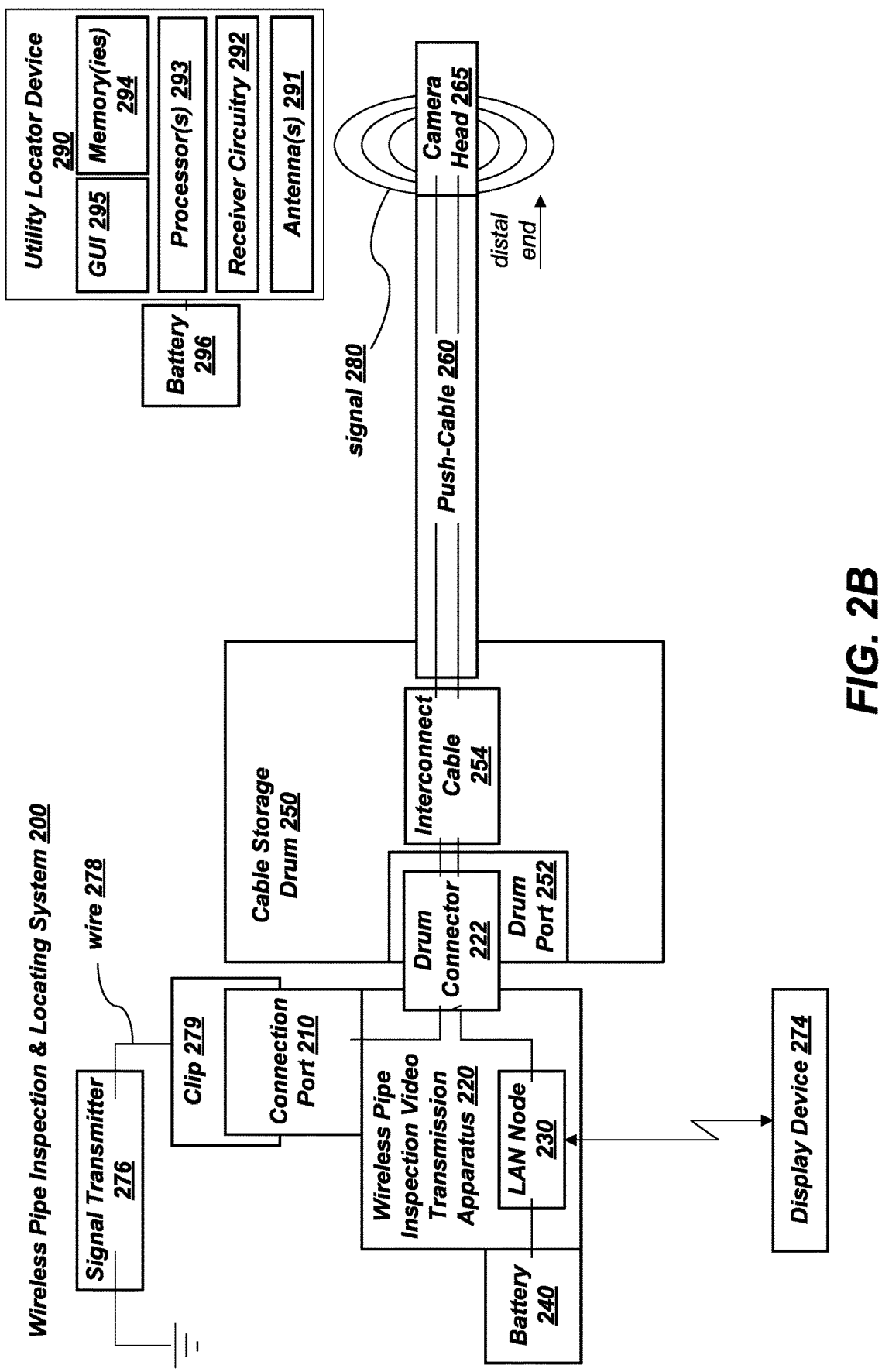
FIG. 2B is a diagram of the wireless pipe inspection and locating system of FIG. 2A.

Turning to FIGS. 2A and 2B, a wireless pipe inspection and locating system embodiment 200 using a relay module with an associated connection port as described herein is illustrated. System embodiment 200 may include a connection port 210 in keeping with the present disclosure disposed on or in a relay module 220. The relay module 220 may include a wireless LAN node 230 and may include a rechargeable battery 240. The relay module may be removably couplable to a cable storage drum 250 which may be or share aspects with the cable storage drum 150 of FIGS. 1C and 1D. For instance, a drum connector 222 on the relay module 220 may couple to cable storage drum 250 via a drum port 252. In some embodiments, the drum connector 222 and drum port 252 may be a slip ring or other connector for providing current signals from the connection port 210 and relay module 220, which may remain stationary, to a rotating portion of the cable storage drum 250. In other embodiments, the relay module 220 and connection port 210 may rotate with the rotating portion of the cable storage drum 250, such as from the electromechanical connection of the drum connector 222 and drum port 252.

Various aspects and details regarding pipe inspection and locating system systems as may be used in embodiments in conjunction with the disclosures here, such as the wireless pipe inspection and locating system 200 and/or wireless pipe inspection and locating systems herein, are described in co-assigned U.S. Pat. No. 8,395,661, issued Mar. 12, 2013, entitled PIPE INSPECTION SYSTEM WITH SELECTIVE IMAGING CAPTURE; U.S. Pat. No. 9,222,809, issued Dec. 29, 2015, entitled PORTABLE PIPE INSPECTION SYSTEMS AND APPARATUS; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,927,368, issued Mar. 27, 2018, entitled SELF-LEVELING INSPECTION SYSTEMS AND METHODS; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/588,834, issued Sep. 9, 2019, entitled VIDEO INSPECTION SYSTEM WITH WIRELESS ENABLED CABLE STORAGE DRUM of the incorporated patents and applications.

During an inspection operation, a push-cable 260 stored in the cable storage drum 250 may be dispensed to move a camera head 265 disposed on the distal end of the push-cable 260 through a pipe 270 (FIG. 2A) or other conduit to identify defects therein (e.g., cracks, leaks, clogs, the ingress of roots, or the like). The camera head 265 may generate video and images that may be sent back to the cable drum via the push-cable 260 and then to the relay module 220. The relay module 220 may further wirelessly communicate, via the LAN node 230 (FIG. 2B) or via other wired or wireless connections (not shown), with a display incorporated device, such as a tablet 272 (FIG. 2A), smart phone, or one or more other display devices 274 (FIG. 2B). In some embodiments, the display device 274 may instead be or include a wirelessly connected CCU. In yet further embodiments, the display device 274 may instead be or include a graphical user interface of a utility locator device (e.g., GUI 295 on the utility locator device 290 of FIG. 2B).

In order to determine, at the ground surface, the location of the identified defect, an AC current signal at one or more frequencies and/or with or without modulation, may be generated by a transmitter 276 and coupled, via a conductive wire 278 or other conductor, to a connection port 210 on the relay module 220, and further through the relay module to a drum port 252 (FIG. 2B) and interconnect cable 254 (FIG. 2B) of the cable storage drum 250. The AC current signal may then be coupled to the push-cable 260 and/or camera head 265, with a corresponding AC magnetic field signal emitted therefrom for detection by a locator. In some embodiments, the conductor of the push-cable 260 may couple to the housing of the camera head 265.

Various aspects and details regarding embodiments of transmitters for use in systems in accordance with the disclosures herein, such as transmitter 276 and other transmitters described herein, are described in co-assigned U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 8,013,610, issued Sep. 6, 2011, entitled HIGH Q SELF-TUNING LOCATING TRANSMITTER; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS of the incorporated patents and applications.

It should be noted that transmitter 276 may have a ground terminal and output conductors or other apparatus for providing a direct contact connection for Earth grounding, for instance, through a connection to a stake forced into the ground surface or the like such as shown in FIG. 2A, where a clip from the transmitter is attached to a ground stake. An AC magnetic field signal 280 may result from the AC current flow in the push-cable 260 and/or camera head 265 and may be received at one or more antennas 291 (FIG. 2B) of a utility locator device 290 and processed therein to provide a user with information on the relative position of the push-cable and/or camera head at the ground surface.

Turning to FIG. 2B, a receiver circuitry 292 coupled to the antenna(s) 291 (FIG. 2B) may, for instance, include one or more buffers and amplifiers to buffer and/or amplify the outputs of the antenna(s) 291 as well as filters, signal conditioners, analog-to-digital (A/D) converters, multiplexers, and the like to provide filtering functionality, signal conditioning, or the like for outputs to one or more processors 293 and determine the emission location of signals 280 at the frequency or frequencies transmitted by the transmitter 276. One or more non-transitory memories 294 may be used to store instructions for implementing various functionality, as described herein, in the one or more processors 293 as well as for storing information associated with measured signals 280, information associated with pipe 270 (FIG. 2A), historic location or position information of the utility locator device 290, and/or to store other data, instructions, or information associated with operation of the utility locator device 290.

Various aspects and details regarding utility locator devices, such as the utility locator device 290 and/or other utility locator devices herein, are described in co-assigned U.S. Pat. No. 7,332,901, issued Feb. 19, 2008, entitled LOCATOR WITH APPARENT DEPTH INDICATION; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,057,754, issued Jun. 16, 2015, entitled ECONOMICAL MAGNETIC LOCATOR APPARATUS AND METHOD; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 29/692,937, filed May 29, 2019, entitled BURIED OBJECT LOCATOR; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,690,795, issued Jun. 23, 2020, entitled LOCATING DEVICES, SYSTEMS, AND METHODS USING FREQUENCY SUITES FOR UTILITY DETECTION; and U.S. Pat. No. 10,809,408, issued Oct. 20, 2020, entitled DUAL SENSED LOCATING SYSTEMS AND METHODS of the incorporated patents and applications.

Referring to FIGS. 2A and 2B, the locations of emitted signals 280, and associated determined locations of the push-cable 260 and camera head 265, may be communicated to a user 282 (FIG. 2A) via a graphical user interface (GUI) 295 (FIG. 2B) disposed on the utility locator device 290. The utility locator device 290 may further include one or more batteries 296 (FIG. 2B) to provide electrical power. In some embodiments, the utility locator device 290 may further include one or more global navigation satellite system (GNSS) sensors or other positioning systems to further map the locations in the world frame. The locator may also include a wired or wireless communications transceiver, such as a WiFi or Bluetooth transceiver, to send the determined location information to a wirelessly coupled device such as a tablet, smartphone, computer, CCU, and the like.

Figure 3A:
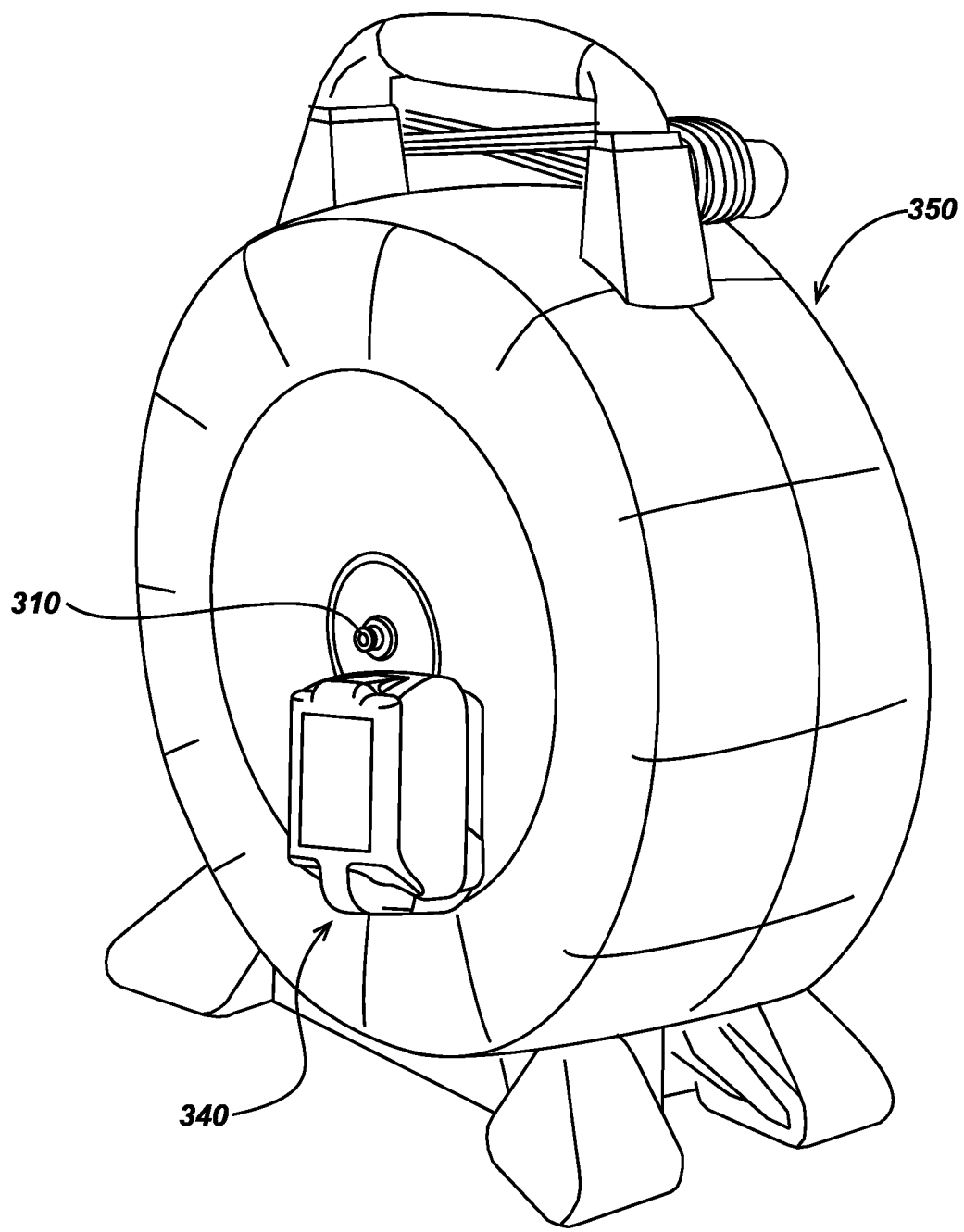
FIG. 3A is an illustration of a cable storage drum with a connector port.

In other connector port embodiments in accordance with aspects of the present disclosure, the relay module and associated connection port may be built into a cable storage drum. For example, turning to FIGS. 3A and 3B, a connection port 310 and a relay module 320 (FIG. 3B) may be built into a cable storage drum 350. The connection port 310 may provide an electrically conductive pathway from a connected wire or other conductor (not shown in FIG. 3A) into cable storage drum 350 which, as shown in FIG. 3B, continues through an interconnect cable 354 and to a push-cable 360 and camera head 365.

In some embodiments, a slip ring or similar or equivalent electromechanical connector (not shown) may be included to couple AC current signals from a stationary connection port 310 or stationary portion of the connection port 310 to a rotating portion of the cable storage drum 350. In other embodiments, the connection port 310 may rotate with the rotating portion of the connection port 310. In some embodiments, the electrically conductive pathway may be or include the use of a ground wire in the push-cable 360. In other embodiments, the push-cable 360 may include a separate conductor for the purposes of transmitting electromagnetic signals from the transmitter (e.g., the transmitter 476 of FIGS. 4A and 4B).

Figure 3B:
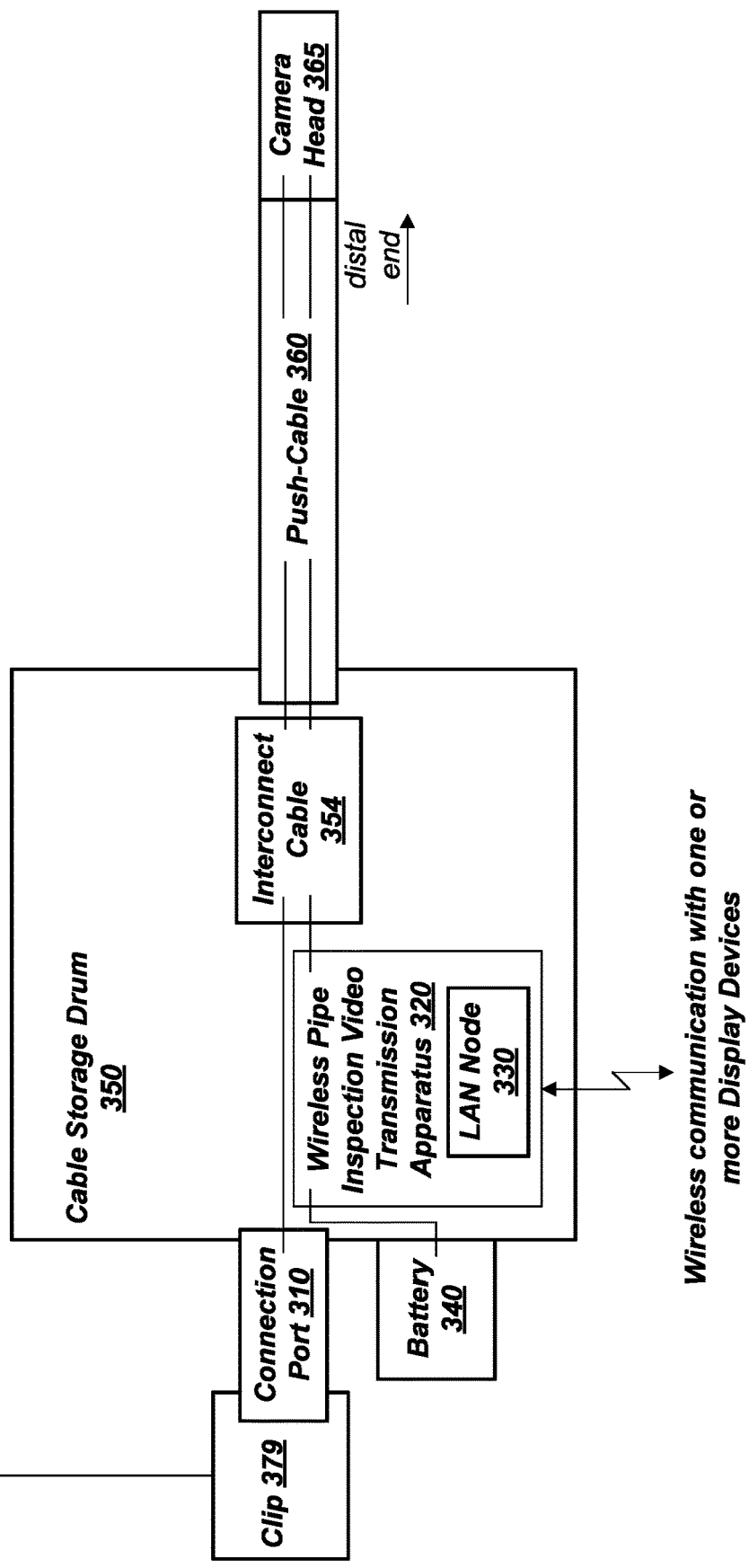
FIG. 3B is a diagram of the cable storage drum and connector port of FIG. 3A.
Figure 4A:
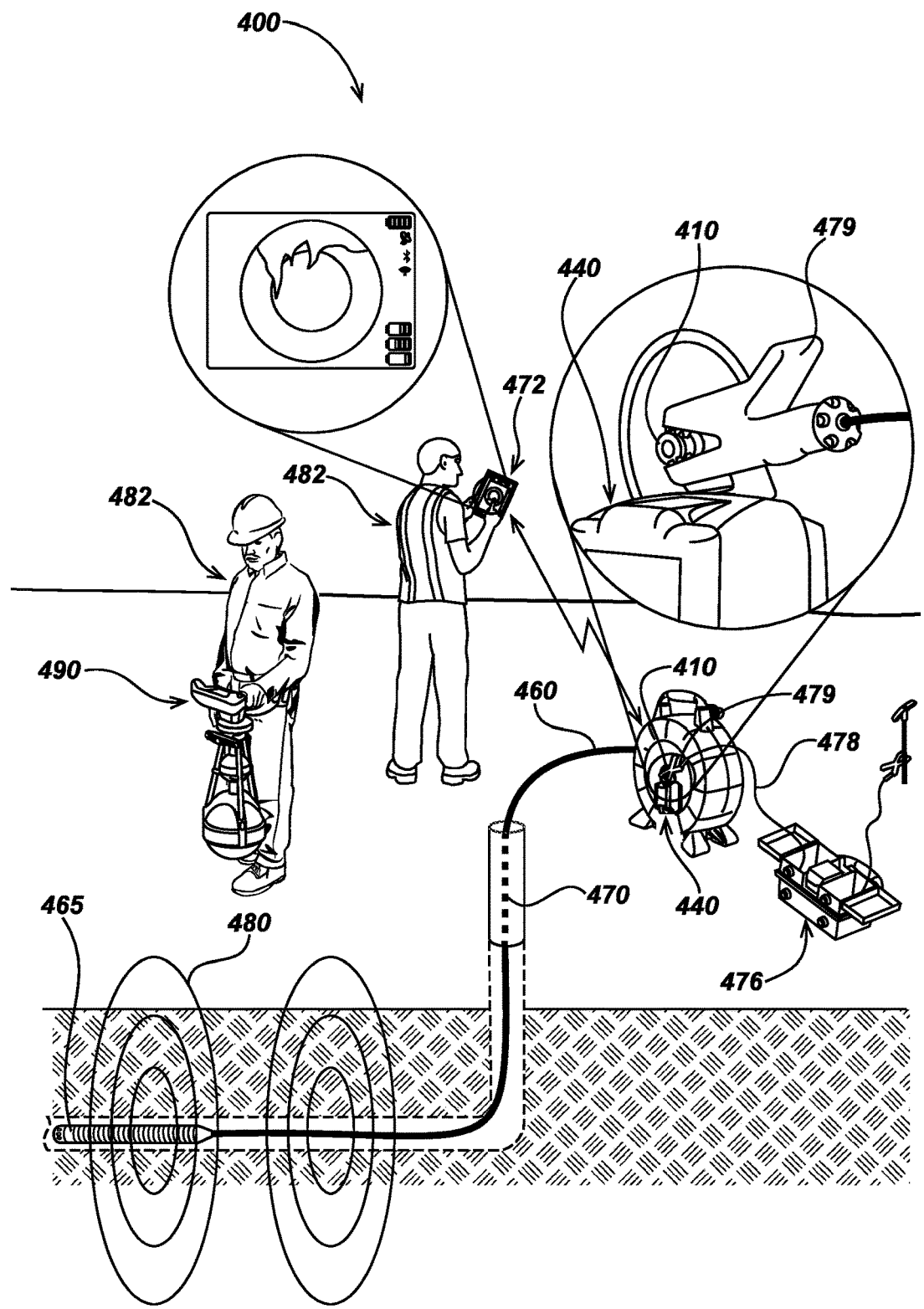
FIG. 4A is an illustration of another wireless pipe inspection video transmission apparatus.
Figure 4B:
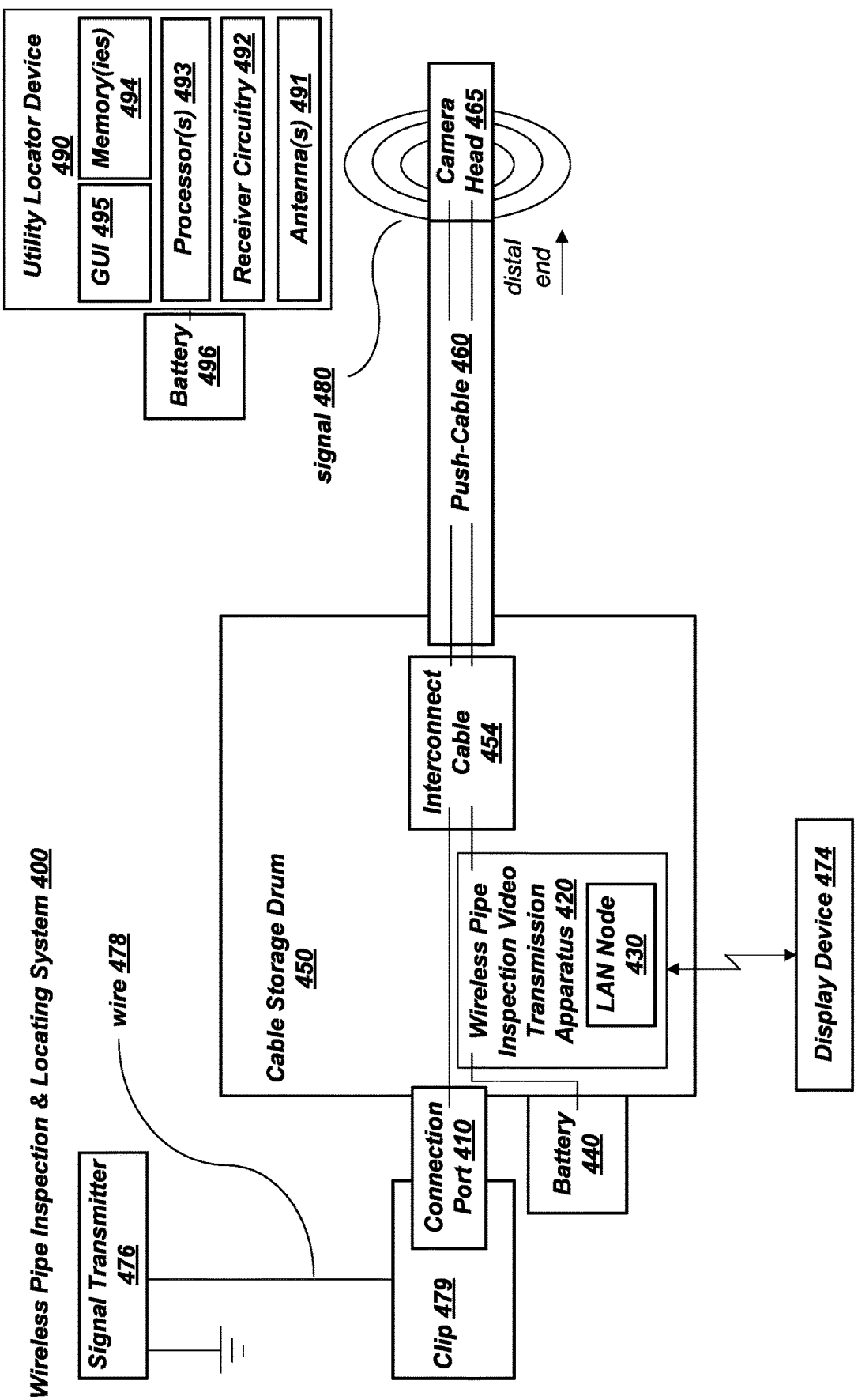
FIG. 4B is a diagram of the wireless pipe inspection and locating system of FIG. 4A.

Further illustrated in FIG. 3B, relay module 320 may include one or more radio transceivers, such as a local area network (LAN) node 330, which may be or include Bluetooth, Wi-Fi or other wireless local area network (WLAN), or like radio transceivers to further communicate with one or more display devices (e.g., tablet 472 of FIG. 4A) for the purposes of displaying video and imagery as well as controlling the wirelessly connected inspection system (e.g., wireless pipe inspection and locating system 400 of FIGS. 4A and 4B). A battery 340 may connect to the cable storage drum 350 for distributing electrical power to the LAN node 330 as well as the camera head 365 disposed on the distal end of the push-cable 360.

Turning to FIGS. 4A and 4B, a wireless pipe inspection and locating system 400 is illustrated having a connection port 410 and a wireless pipe inspection video transmission apparatus 420 (FIG. 4B) built into a cable storage drum 450. As illustrated, the connection port 410 may establish an electrically conductive pathway to the cable storage drum 450 which, as shown in FIG. 4B, may continue through an interconnect cable 454 and on to a push-cable 460 and camera head 465. In some embodiments, the electrically conductive pathway may be or include the use of a ground wire in the push-cable 460. In other embodiments, the push-cable 460 may include a separate conductor for the purposes of transmitting electromagnetic signals from the transmitter (e.g., transmitter 476 of FIGS. 4A and 4B).

As best illustrated in FIG. 4B, the wireless pipe inspection video transmission apparatus 420 may include one or more radio transceivers, such as a local area network (LAN) node 430, which may be or include Bluetooth, Wi-Fi or other wireless local area network (WLAN), or like radio transceivers to further communicate with one or more display devices, such as a display device 474, for the purposes of displaying video and imagery generated by the camera head 465 as well as controlling the wireless pipe inspection and locating system 400. A battery 440 may connect to the cable storage drum 450 for distributing electrical power to the LAN node 430 as well as the camera head 465 disposed on the distal end of the push-cable 460.

During an inspection operation, a push-cable 460 stored in the cable storage drum 450 may be dispensed to move a camera head 465 disposed on the distal end of the push-cable 460 through a pipe 470 (FIG. 4A) or other conduit to identify defects therein (e.g., cracks, leaks, clogs, the ingress of roots, or the like). The camera head 465 may generate video and images that may be transmitted back via the push-cable 460 to the relay module 420. The relay module 420 may wirelessly communicate, via the LAN node 430 (FIG. 4B), with a tablet 472 (FIG. 4A), smart phone, or one or more other display devices 474 (FIG. 4B), video, images, control information for the camera head, and/or other data or information related to the video inspection. In some embodiments, the display device 474 may instead be or include a wirelessly connected CCU. In yet further embodiments, the display device 474 may instead be or include a graphical user interface of a utility locator device (e.g., GUI 495 on the utility locator device 490 of FIG. 4B).

In order to determine, at the ground surface, the location of the identified defect, an AC current signal at one or more frequencies may be generated by a transmitter 476 and coupled, via a wire 478, to a connection port 410. A clip 479 attached to one end of the wire 478 may be used to removably attach he wire 478 to the connection port 410 on the cable storage drum 450.

In some embodiments, a slip ring or like electromechanical connector may be included for the transmission of electromagnetic signals from a stationary connection port 410 or stationary portion of the connection port 410 to a rotating portion of the cable storage drum 450. Likewise, in some embodiments, the connection port 410 may instead be located on a non-rotating portion of the cable storage drum 450 and connect, via a slip ring or like electromechanical connector, to the rotating portion of the cable storage drum 450. In other embodiments, the connection port 410 may rotate with the rotating portion of the connection port 410.

The electrically conductive pathway for the AC current signal may extend from the connection port 410 to an interconnect cable 454 and further to the push-cable 460 and/or camera head 465. In some embodiments, the conductor of the push-cable 460 may be coupled to the housing of the camera head 465.

The transmitter 476 may further be grounded, for instance, through a connection to a stake forced into the ground or through other ground contact connections. The AC magnetic field signal 480 emitted by push-cable 460 and/or camera head 465 may be received at one or more antennas 491 of a utility locator device 490 and processed therein to determine positional information of the push-cable and/or camera head at the ground surface.

Associated receiver circuitry 492 coupled to the antenna(s) 491 may, for instance, include one or more buffers and amplifiers to buffer and/or amplify the outputs of the antenna(s) 491 as well as filters, signal conditioners, analog-to-digital (A/D) converters, multiplexers, and the like to provide filtering functionality, signal conditioning, or the like for outputs to one or more processors 493 to determine the emission locations of signals 480 at the frequency or frequencies transmitted by the transmitter 476. One or more non-transitory memories 494 may be used to store instructions for implementing various functionality, as described herein, in the one or more processors 493 as well as for storing information associated with measured signals 480, information associated with pipe 470 (FIG. 4A), historic location or position information of the utility locator device 490, and/or for storing other data, instructions, or information associated with operation of the utility locator device 490.

The locations of emitted signals 480, and associated push-cable 460 and camera head 465, may be communicated to a user 482 (FIG. 4A) via a graphical user interface (GUI) 495 (FIG. 4B) disposed on the utility locator device 490. The utility locator device 490 may further include one or more batteries 496 to provide electrical power. In some embodiments, the utility locator device 490 may further include one or more GNSS or other positioning systems to further map the locations in the world frame.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles or any combination thereof.

The processors as described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A processing element may further include or be coupled to one or more memory elements for storing instructions, data and/or other information in a non-transitory digital storage format.

The scope of the disclosure is not intended to be limited to the aspects shown herein, but is to be accorded the full scope consistent with the language of this specification and accompanying drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the scope of the invention is not intended to be limited to the aspects shown herein but is to be accorded the widest scope consistent with the principles and novel features disclosed herein.

We claim:

1. A video inspection system apparatus, comprising:
   a cable storage drum;
   a relay module disposed on or in the cable storage drum, the relay module including:
   a wireless communications transceiver;
   a connection port with a first end having a conductor for attaching the conductor from an associated transmitter, and a second end electrically connected to the first end;
   a push-cable electrically connected at a proximal end to a second end of the relay module to receive an AC current signal generated in a transmitter and coupled through the relay module; and
   a camera head operatively coupled to a distal end of the push-cable.

2. The apparatus of claim 1, wherein the camera head is electrically coupled to the AC current signal.

3. The apparatus of claim 1, wherein the wireless communications transceiver comprises a cellular network transceiver.

4. The apparatus of claim 1, wherein the wireless communications transceiver comprises a local area network (LAN) transceiver.

5. The apparatus of claim 4, wherein the LAN transceiver comprises a WiFi or Bluetooth transceiver.

6. The apparatus of claim 1, further including a rechargeable battery operatively coupled to the relay module.

7. The apparatus of claim 1, wherein the relay module includes a drum connector to mechanically and electrically couple the relay module to the cable storage drum.

8. The apparatus of claim 1, wherein the connection port comprises a drum connector configured to mate to a corresponding drum port.

9. The apparatus of claim 8, wherein the drum connector is configured to mate with the corresponding drum port along a central axis of the cable storage drum.

10. The apparatus of claim 1, wherein the connection port is positioned near an outer extremity of the relay module.

11. The apparatus of claim 1, wherein the connection port first end comprises a conductive stud extending outward from the relay module.

12. The apparatus of claim 11, further including a conductive wire having a first end with a clip electrically coupled thereto to removably attach to the conductive stud and a second end electrically connected to the associated transmitter.

13. The apparatus of claim 1, wherein the relay module is configured to be removably attachable to the cable drum.

14. The apparatus of claim 1, wherein the relay module is fixed to the cable drum.

15. The apparatus of claim 1, wherein the relay module is integral with the cable drum.

16. The apparatus of claim 15, wherein the connection port is disposed in the cable drum.

17. The apparatus of claim 16, wherein the connection port first end is positioned along the cable drum rotational axis.

18. The apparatus of claim 1, wherein the relay module includes electronics to receive image or video signals from the camera head and provide corresponding images or video signals to the wireless communications transceiver for transmission to a wireless communicatively coupled device having a display.

19. The apparatus of claim 18, wherein the wireless communicatively coupled device comprises a laptop, cellular phone, or tablet.

20. The apparatus of claim 19, wherein the wireless communications transceiver comprises a WiFi or Bluetooth transceiver.

21. A connection port disposed on a wireless pipe inspection video transmission apparatus, wherein the transmission apparatus is removably attachable to a rotating portion of a cable storage drum of a pipe inspection system, wherein the connection port is configured to rotate with the rotating portion of the cable storage drum, wherein the connection port is electrically wired with a transmitter to transmit electromagnetic signals to a push-cable and camera head coupled to the cable storage drum, wherein a utility locator device determines the location of the push-cable and camera head by detecting the transmitted electromagnetic signals.

22. The connection port of claim 21, wherein the wireless pipe inspection transmission apparatus is a separate device that couples to the cable storage drum.

23. The connection port of claim 21, wherein a slip ring or other electromechanical connector is included for the transmission of electromagnetic signals from a stationary connection port, stationary portion of the connection port, or stationary wireless pipe inspection transmission apparatus to a rotating portion of the cable storage drum.

24. The connection port of claim 21, wherein the wireless pipe inspection transmission apparatus is built into a cable storage drum.

25. The connection port of claim 24, wherein the connection port is located on the cable storage drum at a location other than the wireless pipe inspection transmission apparatus.

26. A combined pipe inspection and locating system including wireless pipe inspection video transmission, comprising;
    a cable storage drum for storing and dispensing of a push-cable such that it may be moved through a pipe or other conduit and further including a camera head coupled to a distal end of the push-cable for inspecting the interior of the pipe or conduit;
    a wireless pipe inspection video transmission apparatus for wirelessly communicating data relating to the in-pipe video or imagery collected at the camera head to one or more display devices as well as communicate data relating to controlling the camera head and inspection system;
    a transmitter for generating an electromagnetic signal at one or more known frequencies;
    a utility locator device having one or more antennas and associated receiver circuitry to receive electromagnetic signals at the ground level, process signals via one or more processors and associated non-transitory memories to determine the emission location of signals at the frequency or frequencies transmitted by the transmitter, and a graphical user interface to communicate the locations; and
    a connection port disposed on the wireless pipe inspection video transmission apparatus that, attached to a rotating portion of the cable storage drum wherein the connection port is configured to rotate with the rotating portion of the cable storage drum, establishes, via a wire, an electrically conductive pathway with the transmitter to transmit electromagnetic signals to the push-cable and camera head at one or more known frequencies.

27. The combined pipe inspection and locating system of claim 26, wherein the transmitter is a multi-frequency transmitter.

28. The combined pipe inspection and locating system of claim 26, wherein the wireless pipe inspection transmission apparatus is a separate device that couples to a pipe inspection cable storage drum.

29. The combined pipe inspection and locating system of claim 26, wherein a slip ring or other electromechanical connector is included for the transmission of electromagnetic signals from a stationary connection port, stationary portion of the connection port, or stationary wireless pipe inspection transmission apparatus to a rotating portion of the cable storage drum.

30. The combined pipe inspection and locating system of claim 26, wherein the wireless pipe inspection transmission apparatus is built into the cable storage drum.

31. The combined pipe inspection and locating system of claim 30, wherein the connection port is located on the cable storage drum at a location other than the wireless pipe inspection transmission apparatus.

32. The combined pipe inspection and locating system of claim 26, wherein the display device includes a smart phone, tablet, or laptop computer.

33. The combined pipe inspection and locating system of claim 26, wherein the display device includes a dedicated camera control device that includes a graphical display.

34. The combined pipe inspection and locating system of claim 26, wherein the display device is built into the utility locator device.

* * * * *